United States Patent
Shih et al.

(10) Patent No.: US 9,570,996 B2
(45) Date of Patent: Feb. 14, 2017

(54) FORWARD-BASED POWER CONVERSION APPARATUS

(71) Applicant: FSP TECHNOLOGY INC., Taoyuan County (TW)

(72) Inventors: Yung-Hsiang Shih, Taoyuan County (TW); Chang-Hsun Chiang, Taoyuan County (TW)

(73) Assignee: FSP TECHNOLOGY INC., Taoyuan (TW)

( * ) Notice: Subject to any disclaimer, the term of this patent is extended or adjusted under 35 U.S.C. 154(b) by 730 days.

(21) Appl. No.: 14/019,532

(22) Filed: Sep. 5, 2013

(65) Prior Publication Data

US 2014/0062187 A1 Mar. 6, 2014

(30) Foreign Application Priority Data

Sep. 6, 2012 (TW) .............................. 101132541 A

(51) Int. Cl.
*H02J 3/00* (2006.01)
*H02M 3/335* (2006.01)

(52) U.S. Cl.
CPC ..... *H02M 3/33553* (2013.01); *H02M 3/33561* (2013.01); *Y10T 307/297* (2015.04)

(58) Field of Classification Search
USPC .......................................................... 307/17
See application file for complete search history.

(56) References Cited

U.S. PATENT DOCUMENTS

| 5,162,663 A * | 11/1992 | Combs ................... H02J 9/061 |
| | | 307/29 |
| 2008/0253150 A1* | 10/2008 | Wingrove ......... H02M 3/33592 |
| | | 363/21.14 |
| 2011/0215778 A1* | 9/2011 | Chen .................... H02M 3/335 |
| | | 323/267 |

FOREIGN PATENT DOCUMENTS

| TW | 352485 | 2/1999 |
| TW | 200826456 | 6/2008 |

OTHER PUBLICATIONS

"Office Action of Taiwan Counterpart Application", issued on May 28, 2014, p. 1-p. 6, in which the listed references were cited.

* cited by examiner

*Primary Examiner* — Rexford Barnie
*Assistant Examiner* — Xuan Ly
(74) *Attorney, Agent, or Firm* — Jianq Chyun IP Office

(57) ABSTRACT

A forward-based power conversion apparatus is provided. When the forward-based power conversion apparatus supplies a plurality of (at least two of) output voltages to a load, a reverse voltage, corresponding to a lower output voltage, of a secondary winding of a transformer is captured through an equipped output auxiliary unit, so as to assist an output of a higher output voltage. Accordingly, compared to that described in the related art, the reverse voltage of the secondary winding of the transformer described herein can be converted into an effective power output, so that overall power loss of the power conversion apparatus can be reduced, and conversion efficiency of the power conversion apparatus can be improved.

10 Claims, 3 Drawing Sheets

FORWARD-BASED POWER CONVERSION APPARATUS

CROSS-REFERENCE TO RELATED APPLICATION

This application claims the priority benefit of Taiwan application serial no. 101132541, filed on Sep. 6, 2012. The entirety of the above-mentioned patent application is hereby incorporated by reference herein and made a part of this specification.

BACKGROUND OF THE INVENTION

Field of the Invention

The invention relates to a power conversion technique; more particularly, the invention relates to a forward-based power conversion apparatus.

Description of Related Art

One of the common power conversion apparatuses is a forward-based power conversion apparatus. In general, when the forward-based power conversion apparatus supplies an output voltage to a load, a reverse voltage of a secondary winding of a transformer is always not used in an effective manner and is accordingly wasteful. On said condition, the overall power loss of the power conversion apparatus may increase, thus lessening the conversion efficiency of the power conversion apparatus.

SUMMARY OF THE INVENTION

The invention is directed to a forward-based power conversion apparatus capable of resolving the above-mentioned issues.

An exemplary embodiment of the invention provides a power conversion apparatus that includes a transformer, a power switch, a first power conversion circuit, a second power conversion circuit, and an output auxiliary unit. The transformer has a primary winding, a first secondary winding, and a second secondary winding, wherein an opposite-polarity terminal of the primary winding receives an input voltage. A first terminal of the power switch is coupled to a common-polarity terminal of the primary winding, a second terminal of the power switch is coupled to a ground potential, and a control end of the power switch receives a pulse width modulation (PWM) signal.

The first power conversion circuit is coupled to the first secondary winding of the transformer, so as to convert a first induction voltage of the first secondary winding and supply a first output voltage. The second power conversion circuit is coupled to the second secondary winding of the transformer, so as to convert a second induction voltage of the second secondary winding and supply a second output voltage. Here, the first output voltage is greater than the second output voltage. The output auxiliary unit is coupled between the second secondary winding of the transformer and the first power conversion circuit. When the first power conversion circuit and the second power conversion circuit respectively supply the first output voltage and the second output voltage, the output auxiliary unit captures a reverse voltage of the second secondary winding of the transformer to assist an output of the first power conversion circuit.

In an exemplary embodiment of the invention, both the first power conversion circuit and the second power conversion circuit are forward power conversion circuits.

In an exemplary embodiment of the invention, the first power conversion circuit includes a first diode, a second diode, a first inductor, and a first capacitor. An anode of the first diode is coupled to an opposite-polarity terminal of the first secondary winding. An anode of the second diode is coupled to a common-polarity terminal of the first secondary winding, and a cathode of the second diode is coupled to a cathode of the first diode. A first terminal of the first inductor is coupled to the cathodes of the first diode and the second diode, and a second terminal of the first inductor supplies the first output voltage. A first terminal of the first capacitor is coupled to the second terminal of the first inductor, and a second terminal of the first capacitor is coupled to the anode of the second diode.

In an exemplary embodiment of the invention, the second power conversion circuit includes a third diode, a fourth diode, a second inductor, and a second capacitor. An anode of the third diode is coupled to an opposite-polarity terminal of the second secondary winding of the transformer. An anode of the fourth diode is coupled to a common-polarity terminal of the second secondary winding, and a cathode of the fourth diode is coupled to a cathode of the third diode. A first terminal of the second inductor is coupled to the cathodes of the third diode and the fourth diode, and a second terminal of the second inductor supplies the second output voltage. A first terminal of the second capacitor is coupled to the second terminal of the second inductor, and a second terminal of the second capacitor is coupled to the anode of the fourth diode.

In an exemplary embodiment of the invention, the output auxiliary unit includes a fifth diode, an anode of the fifth diode is coupled to the opposite-polarity terminal of the second secondary winding, and a cathode of the fifth diode is coupled to the first terminal of the first inductor.

Another exemplary embodiment of the invention provides a power conversion apparatus that includes a transformer, a power switch, a plurality of power conversion circuits, and a plurality of output auxiliary units. The transformer has a primary winding and a plurality of secondary windings, wherein an opposite-polarity terminal of the primary winding of the transformer receives an input voltage. A first terminal of the power switch is coupled to a common-polarity terminal of the primary winding, a second terminal of the power switch is coupled to a ground potential, and a control end of the power switch receives a PWM signal.

The power conversion circuits are respectively coupled to the secondary windings, so as to respectively convert induction voltages of the secondary windings and supply a plurality of output voltages. The output auxiliary units are respectively coupled between the corresponding secondary windings and the corresponding power conversion circuits. When the power conversion circuits respectively supply the output voltages, each of the output auxiliary units captures a reverse voltage of the corresponding secondary winding to assist an output of the corresponding power conversion circuit.

In an exemplary embodiment of the invention, the power conversion circuits are forward power conversion circuits.

In an exemplary embodiment of the invention, each of the output auxiliary units is comprised of at least one diode.

As is discussed above, when the forward-based power conversion apparatus described herein supplies a plurality of (at least two of) output voltages to the load, the reverse voltage, corresponding to the lower output voltage, of the secondary winding of the transformer is captured through an equipped output auxiliary unit, so as to assist the output of the higher output voltage. Thereby, compared to that described in the related art, the reverse voltage of the secondary winding of the transformer can be converted into an effective power output, so that the overall power loss of the power conversion apparatus can be reduced, and the conversion efficiency of the power conversion apparatus can be improved.

However, the above descriptions and the below embodiments are only used for explanation, and they do not limit the scope of the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
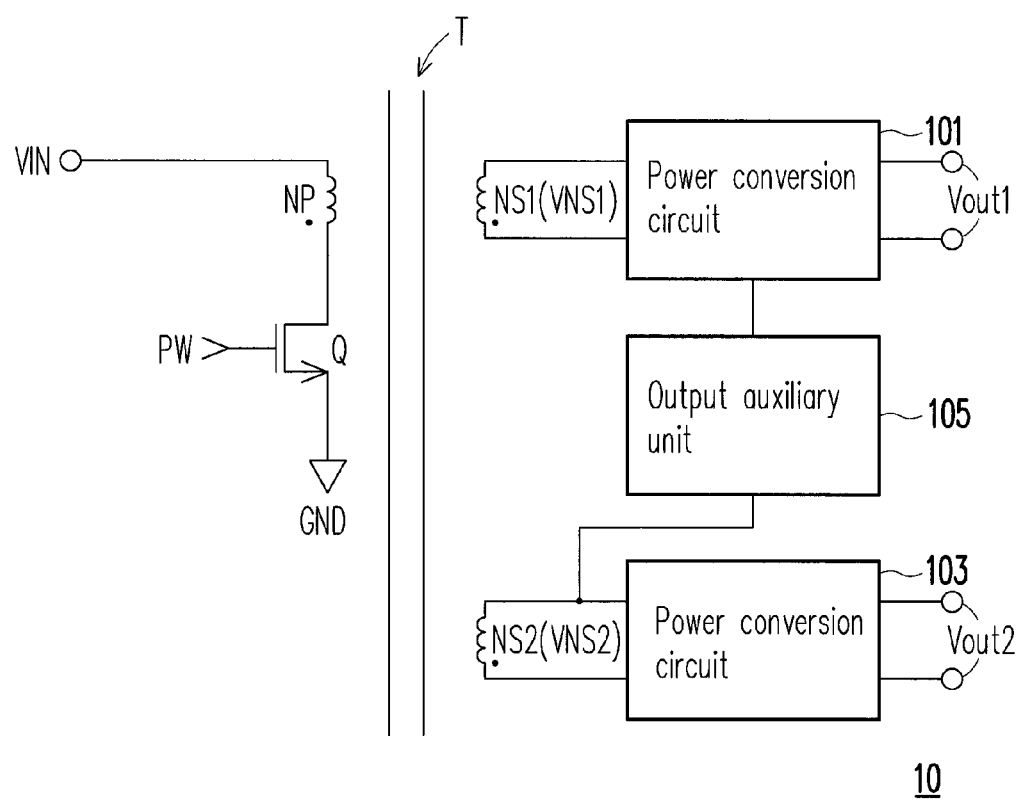
FIG. 1 is a schematic diagram of a power conversion apparatus 10 according to an exemplary embodiment of the invention.

Descriptions of the invention are given with reference to the exemplary embodiments illustrated with accompanied drawings, wherein same or similar parts are denoted with same reference numerals. In addition, whenever possible, identical or similar reference numbers stand for identical or similar elements in the figures and the exemplary embodiments.

FIG. 1 is a schematic diagram of a power conversion apparatus 10 according to an exemplary embodiment of the invention. With reference to FIG. 1, the power conversion apparatus 10 includes a transformer T, a power switch Q, power conversion circuits 101 and 103, and an output auxiliary unit 105. In the present exemplary embodiment, the transformer T has a primary winding NP, a first secondary winding NS1, and a second secondary winding NS2. An opposite-polarity terminal (i.e., the non-dotted terminal) of the primary winding NP of the transformer T receives an input voltage VIN (i.e., a direct input voltage).

A first terminal of the power switch Q is coupled to a common-polarity terminal (i.e., the dotted terminal) of the primary winding NP of the transformer T, a second terminal of the power switch Q is coupled to a ground potential GND, and a control end of the power switch Q receives a PWM signal PW. In the present exemplary embodiment, the power switch Q may be implemented by an N-type power transistor, which should however not be construed as a limitation to the invention. Under said circumstances, the power switch Q is turned on in response to enablement of the PWM signal PW and is turned off in response to disablement of the PWM signal PW. In other words, the power switch Q is turned on when the PWM signal PW is enabled, and the power switch Q is turned off when the PWM signal PW is disabled.

The power conversion circuit 101 is coupled to the first secondary winding NS1 of the transformer T, so as to convert a first induction voltage VNS1 of the first secondary winding NS1 of the transformer T (i.e., AC-to-DC conversion) and supply a first output voltage Vout1 to a load (not shown). The power conversion circuit 103 is coupled to the second secondary winding NS2 of the transformer T, so as to convert a second induction voltage VNS2 of the second secondary winding NS2 of the transformer T (i.e., AC-to-DC conversion) and supply a second output voltage Vout2 to the load. In the present exemplary embodiment, the first output voltage Vout1 supplied by the power conversion circuit 101 may be greater than the second output voltage Vout2 supplied by the power conversion circuit 103.

The output auxiliary unit 105 is coupled between the second secondary winding NS2 of the transformer T and the power conversion circuit 101. When the power conversion circuits 101 and 103 respectively supply the first output voltage Vout1 and the second output voltage Vout2, the output auxiliary unit 105 captures a reverse voltage of the second secondary winding NS2 of the transformer T to assist an output of the power conversion circuit 101.

Figure 2:
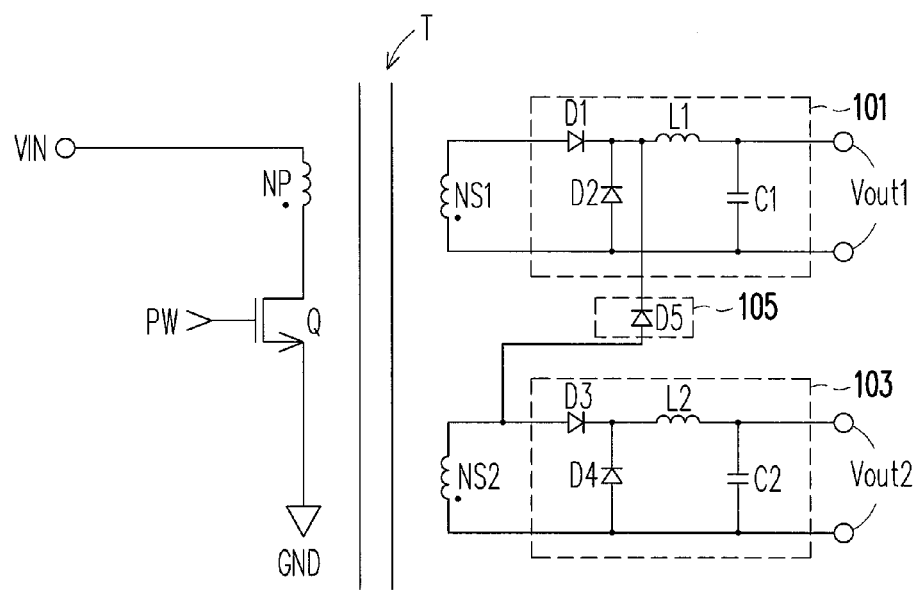
FIG. 2 is a schematic diagram illustrating implementations of the power conversion circuits 101 and 103 and the output auxiliary unit 105 shown in FIG. 1.
Figure 3:
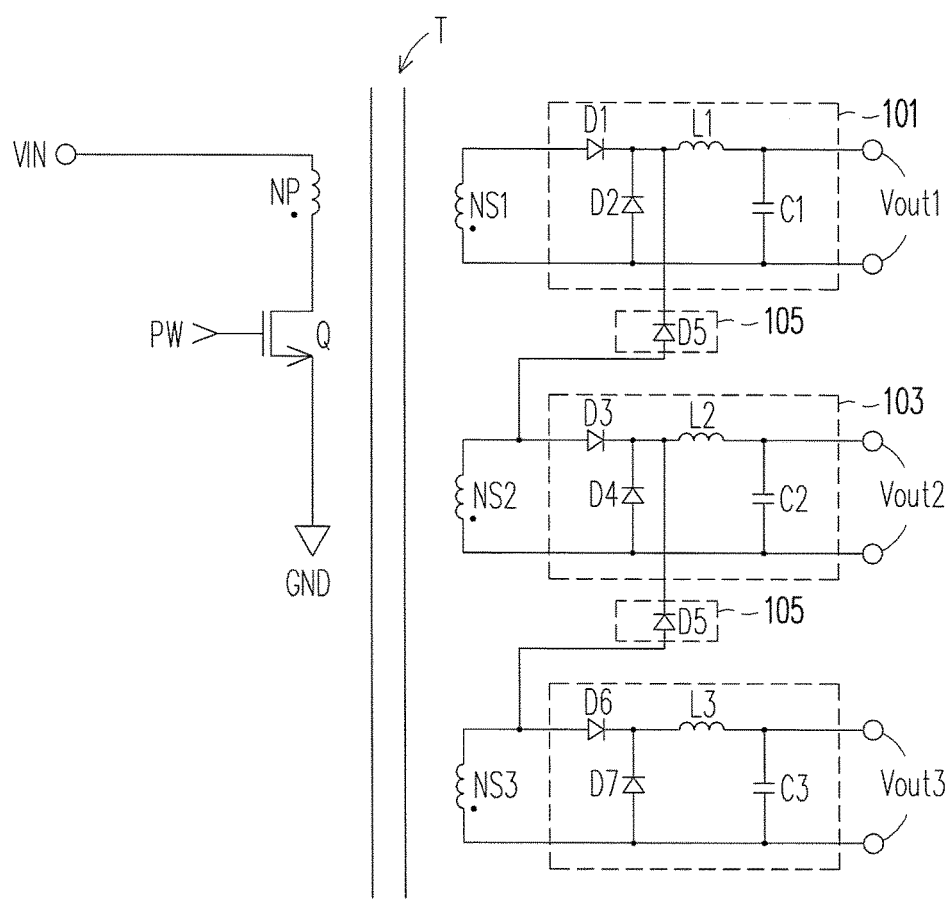
FIG. 3 is a schematic diagram illustrating a power conversion apparatus according to another exemplary embodiment of the invention.

To be specific, please refer to FIG. 2 which is a schematic diagram illustrating implementations of the power conversion circuits 101 and 103 and the output auxiliary unit 105 shown in FIG. 1. With reference to FIG. 1 and FIG. 2, in the present exemplary embodiment, the power conversion circuits 101 and 103 may both be forward power conversion circuits. On said condition, the power conversion circuit 101 may include diodes D1 and D2, an inductor L1, and a capacitor C1.

An anode of the diode D1 is coupled to an opposite-polarity terminal of the first secondary winding NS1 of the transformer T. An anode of the diode D2 is coupled to a common-polarity terminal of the first secondary winding NS1 of the transformer T, and a cathode of the diode D2 is coupled to a cathode of the diode D1. A first terminal of the inductor L1 is coupled to the cathodes of the diodes D1 and D2, and a second terminal of the inductor L1 supplies the first output voltage Vout1. A first terminal of the capacitor C1 is coupled to the second terminal of the inductor L1, and a second terminal of the capacitor C1 is coupled to the anode of the diode D2.

Similarly, the power conversion circuit 103 may include diodes D3 and D4, an inductor L2, and a capacitor C2. An anode of the diode D3 is coupled to an opposite-polarity terminal of the second secondary winding NS2 of the transformer T. An anode of the diode D4 is coupled to a common-polarity terminal of the second secondary winding NS2 of the transformer T, and a cathode of the diode D4 is coupled to a cathode of the diode D3. A first terminal of the inductor L2 is coupled to the cathodes of the diodes D3 and D4, and a second terminal of the inductor L2 supplies the second output voltage Vout2. A first terminal of the capacitor C2 is coupled to the second terminal of the inductor L2, and a second terminal of the capacitor C2 is coupled to the anode of the diode D4.

Note that synchronous rectifiers (SRs) constituted by power transistors may be applied to respectively replace the diodes D1 to D4 in other exemplary embodiments of the invention, so as to form the forward power conversion circuit with a self-driven synchronous rectifying circuit or an externally-driven synchronous rectifying circuit, which will be determined by actual design/application requirements.

On the other hand, the output auxiliary unit 105 includes a diode D5, an anode of the diode D5 is coupled to the opposite-polarity terminal of the second secondary winding NS2 of the transformer T, and a cathode of the diode D5 is coupled to the first terminal of the inductor L1. Note that another one-way conduction element may be applied to replace the diode D5 in another exemplary embodiment of the invention, which will be determined by actual design/application requirements In view of the foregoing, when the power switch Q is turned on in response to enablement of the PWS signal PW, the diodes D1 and D3 are subject to reverse bias and are thus turned off, and the diodes D2 and D4 are subject to forward bias and are thus turned on. Thereby, the capacitors C1 and C2 are respectively charged by the energies previously stored in the inductors L1 and L2, so as to supply the first and second output voltages Vout1 and Vout2 to the load.

Besides, the first output voltage Vout1 is greater than the second output voltage Vout2, and hence the reverse voltage of the second secondary winding NS2 of the transformer T (i.e., the voltage at the opposite-polarity terminal of the second secondary winding NS2) is greater than the reverse voltage of the first secondary winding NS1 of the transformer T. On said condition, the diode D5 is subject to the forward bias and is thus turned on, and thereby the reverse voltage of the second secondary winding NS2 of the transformer T assists the output of the power conversion circuit 101 through the diode D5. The actually-applied reverse voltage of the second secondary winding NS2 of the transformer T, after going through the diode D5, may be preferably designed to be equal to the voltage at the first terminal of the inductor L1, which should however not be construed as a limitation to the invention. Accordingly, the diode with proper forward bias may be employed, or a turn ratio between the primary winding NP and the second secondary winding NS2 may be adjusted.

By contrast, when the power switch Q is turned off in response to disablement of the PWS signal PW, the diodes D1 and D3 are subject to forward bias and are thus turned on, and the diodes D2 and D4 are subject to reverse bias and are thus turned off. Thereby, the inductors L1 and L2 respectively respond to the induction voltages VNS1 and VNS2 of the first and second secondary windings NS1 and NS2 and can then store energies. Since the first output voltage Vout1 is greater than the second output voltage Vout2, the diode D5 is subject to the reverse bias and is thus turned off.

To sum up, when the forward-based power conversion apparatus 10 described herein supplies a plurality of (at least two of) output voltages Vout1 and Vout2 to the load, the reverse voltage, corresponding to the lower output voltage Vout2, of the secondary winding NS2 of the transformer T is captured through the equipped output auxiliary unit 105, so as to assist the output of the higher output voltage Vout1. Thereby, compared to that described in the related art, the reverse voltage of the secondary winding NS2 of the transformer T can be converted into an effective power output, so that the overall power loss of the power conversion apparatus 10 can be reduced, and the conversion efficiency of the power conversion apparatus 10 can be improved.

It should be mentioned that the two output voltages Vout1 and Vout2 are provided to the load in the previous exemplary embodiments, which should however not be construed as a limitation to the invention. Particularly, in response to the power supply requirement of the load, the number of the secondary windings of the transformer T and the number of the corresponding forward power conversion circuits may be increased, so as to supply more than two output voltages to the load. Moreover, according to the descriptions in the previous exemplary embodiments, an additional one-way conduction element (i.e., the diode D5) similar to the output auxiliary unit 105 may be configured between the corresponding secondary winding and the power conversion circuit, such that the reverse voltage of the secondary winding can be used to assist the output of the power conversion circuit. Thereby, the same effects as those accomplished in view of the previous exemplary embodiments may also be achieved herein.

In light of the foregoing, any technical means/scheme/concept of utilizing the reverse voltage of the secondary winding to assist the output of the power conversion circuit falls within the protection scope of the invention and should not be limited to those described in the previous exemplary embodiments. It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents. Any of the exemplary embodiments or any of the claims of the invention does not need to achieve all of the advantages or features disclosed by the invention. Moreover, the abstract and the headings are merely used to aid in searches of patent files and are not intended to limit the scope of the claims of the invention.

What is claimed is:

1. A power conversion apparatus comprising:
   a transformer having a primary winding, a first secondary winding, and a second secondary winding, wherein an opposite-polarity terminal of the primary winding receives an input voltage;
   a power switch having a first terminal coupled to a common-polarity terminal of the primary winding, a second terminal coupled to a ground potential, and a control end receiving a pulse width modulation signal;
   a first power conversion circuit coupled to the first secondary winding, and configured to convert a first induction voltage of the first secondary winding, so as to supply a first output voltage;
   a second power conversion circuit coupled to the second secondary winding, and configured to convert a second induction voltage of the second secondary winding, so as to supply a second output voltage, wherein the first output voltage is greater than the second output voltage; and
   an output auxiliary unit coupled between the second secondary winding and the first power conversion circuit, wherein when the first power conversion circuit and the second power conversion circuit respectively supply the first output voltage and the second output voltage, the output auxiliary unit captures a reverse voltage of the second secondary winding to assist an output of the first power conversion circuit.

2. The power conversion apparatus as recited in claim 1, wherein both the first power conversion circuit and the second power conversion circuit are forward power conversion circuits.

3. The power conversion apparatus as recited in claim 2, wherein the first power conversion circuit comprises:
   a first diode having an anode coupled to an opposite-polarity terminal of the first secondary winding;
   a second diode having an anode coupled to a common-polarity terminal of the first secondary winding, and a cathode coupled to a cathode of the first diode;
   a first inductor having a first terminal coupled to the cathodes of the first diode and the second diode, and a second terminal supplying the first output voltage; and
   a first capacitor having a first terminal coupled to the second terminal of the first inductor, and a second terminal coupled to the anode of the second diode.

4. The power conversion apparatus as recited in claim 3, wherein the second power conversion circuit comprises:

a third diode having an anode coupled to an opposite-polarity terminal of the second secondary winding;

a fourth diode having an anode coupled to a common-polarity terminal of the second secondary winding, and a cathode coupled to a cathode of the third diode;

a second inductor having a first terminal coupled to the cathodes of the third diode and the fourth diode, and a second terminal supplying the second output voltage; and a second capacitor having a first terminal coupled to the second terminal of the second inductor, and a second terminal coupled to the anode of the fourth diode.

5. The power conversion apparatus as recited in claim 4, wherein the output auxiliary unit comprises:

a fifth diode having an anode coupled to the opposite-polarity terminal of the second secondary winding, and a cathode coupled to the first terminal of the first inductor.

6. The power conversion apparatus as recited in claim 1, wherein the power switch is implemented by an N-type power transistor.

7. The power conversion apparatus as recited in claim 6, wherein the power switch is turned on when the pulse width modulation signal is enable, and the power switch is turned off when the pulse width modulation signal is disabled.

8. A power conversion apparatus comprising:

a transformer having a primary winding and a plurality of secondary windings, wherein an opposite-polarity terminal of the primary winding receives an input voltage;

a power switch having a first terminal coupled to a common-polarity terminal of the primary winding, a second terminal of the power switch coupled to a ground potential, and a control end receiving a pulse width modulation signal;

a plurality of power conversion circuits respectively coupled to the secondary windings, and configured to respectively convert induction voltages of the secondary windings, so as to supply a plurality of output voltages; and a plurality of output auxiliary units respectively coupled between the corresponding secondary windings and the corresponding power conversion circuits, wherein when the power conversion circuits respectively supply the output voltages, each of the output auxiliary units captures a reverse voltage of the corresponding secondary winding to assist an output of the corresponding power conversion circuit.

9. The power conversion apparatus as recited in claim 8, wherein the power conversion circuits are forward power conversion circuits.

10. The power conversion apparatus as recited in claim 9, wherein each of the output auxiliary units is comprised of at least one diode.

* * * * *